US012466737B2

(12) United States Patent
Gaikwad et al.

(10) Patent No.: US 12,466,737 B2
(45) Date of Patent: Nov. 11, 2025

(54) SYSTEM AND METHOD FOR PERFORMING SEPARATION AND DEHYDROXYLATION OF FUMED SILICA SOOT PARTICLES

(71) Applicant: Sterlite Technologies Limited, Gurugram (IN)

(72) Inventors: Sandeep Gaikwad, Gurugram (IN); Shivi Dixit, Gurugram (IN); Badri Gomatam, Gurugram (IN)

( * ) Notice: Subject to any disclaimer, the term of this patent is extended or adjusted under 35 U.S.C. 154(b) by 0 days.

(21) Appl. No.: 18/732,805

(22) Filed: Jun. 4, 2024

(65) Prior Publication Data

US 2024/0327230 A1    Oct. 3, 2024

Related U.S. Application Data

(62) Division of application No. 16/849,956, filed on Apr. 15, 2020, now abandoned.

(30) Foreign Application Priority Data

Aug. 13, 2019   (IN) .............................. 201921032781

(51) Int. Cl.
| | |
|---|---|
| B01D 45/16 | (2006.01) |
| B01J 8/00 | (2006.01) |
| B01J 8/18 | (2006.01) |
| B04C 5/02 | (2006.01) |
| B04C 5/20 | (2006.01) |
| C01B 33/18 | (2006.01) |

(52) U.S. Cl.
CPC .............. *C01B 33/18* (2013.01); *B01D 45/16* (2013.01); *B01J 8/0055* (2013.01); *B01J 8/1827* (2013.01); *B04C 5/02* (2013.01); *B04C 5/20* (2013.01); *B01J 2208/00769* (2013.01)

(58) Field of Classification Search
CPC ....... C01B 33/18; C01B 33/181; B01D 45/16; B01J 8/0055; B01J 8/1827; B01J 2208/00769; B04C 5/02; B04C 5/20; C03B 37/01282; C03B 19/06
See application file for complete search history.

(56) References Cited

U.S. PATENT DOCUMENTS 2,607,438 A * 8/1952 Bailey .................... B01J 8/0055
                                                                55/423
2,967,618 A * 1/1961 Vane ........................ D21D 5/18
                                                                210/801
3,064,811 A * 11/1962 Mumper ................... B04C 5/20
                                                                96/372

(Continued)

*Primary Examiner* — Dung H Bui
(74) *Attorney, Agent, or Firm* — Steven R. Fairchild (57) ABSTRACT

The present disclosure provides a separator system for performing separation and dehydroxylation of fumed silica particles. The separator system includes a first inlet, a second inlet, a main body, a first outlet and a second outlet. The first inlet collects a primary feed of fumed silica particles from a gaseous stream into a double entry cyclone. The second inlet collects a secondary feed of chlorine gas into the double entry cyclone. The main body of the double entry cyclone is utilized in treating the primary feed and the secondary feed along with heat inside the double entry cyclone. Furthermore, the first outlet is utilized for releasing the dehydrated fumed silica particles and the second outlet is utilized for releasing the water molecules and other gases.

4 Claims, 5 Drawing Sheets

(56) References Cited

U.S. PATENT DOCUMENTS

| | | | | |
|---|---|---|---|---|
| 3,150,943 | A * | 9/1964 | Darrow | B04C 3/02 |
| | | | | 96/372 |
| 3,645,684 | A * | 2/1972 | De Cuir | C09C 1/3009 |
| | | | | 23/313 R |
| 3,806,586 | A * | 4/1974 | Mollerstedt | C01B 33/025 |
| | | | | 423/350 |
| 4,036,933 | A * | 7/1977 | Laufer | C09C 1/3027 |
| | | | | 423/338 |
| 5,203,284 | A * | 4/1993 | Dietz | F23C 10/10 |
| | | | | 122/6 A |
| 5,935,528 | A * | 8/1999 | Stephenson | B01J 8/1827 |
| | | | | 423/253 |
| 6,113,668 | A * | 9/2000 | Kneringer | C22C 1/056 |
| | | | | 148/237 |
| 10,238,706 | B1 * | 3/2019 | Nahtigal | B01D 11/0203 |
| 10,323,606 | B2 * | 6/2019 | Wilson | F16N 39/002 |
| 2004/0040178 | A1 * | 3/2004 | Coles | B04C 11/00 |
| | | | | 34/591 |
| 2006/0157899 | A1 * | 7/2006 | Weaver | F27B 3/225 |
| | | | | 266/197 |
| 2006/0222705 | A1 * | 10/2006 | Flanner | A61K 9/2072 |
| | | | | 424/464 |
| 2006/0230995 | A1 * | 10/2006 | Muschelknautz | B01J 8/0055 |
| | | | | 110/341 |
| 2010/0000943 | A1 * | 1/2010 | Carson | G01N 30/84 |
| | | | | 210/93 |
| 2012/0037000 | A1 * | 2/2012 | Krishnamurthy | B01D 45/16 |
| | | | | 55/394 |
| 2015/0041454 | A1 * | 2/2015 | Foret | B23K 15/06 |
| | | | | 219/601 |
| 2015/0158034 | A1 * | 6/2015 | Tammera | B04C 5/14 |
| | | | | 55/346 |
| 2016/0214119 | A1 * | 7/2016 | Lankinen | B01D 45/12 |
| 2016/0279556 | A1 * | 9/2016 | Law | B01D 45/16 |
| 2017/0209843 | A1 * | 7/2017 | Narin | B04C 5/081 |
| 2018/0274083 | A1 * | 9/2018 | Hanket | C23C 14/243 |
| 2018/0306439 | A1 * | 10/2018 | Kweon | F23J 9/00 |
| 2019/0077672 | A1 * | 3/2019 | Otter | C03C 1/022 |
| 2019/0131066 | A1 * | 5/2019 | Rong | H01F 41/0293 |
| 2019/0152898 | A1 * | 5/2019 | Shouche | C07C 253/24 |
| 2019/0237206 | A1 * | 8/2019 | Lahoda | G21C 3/58 |
| 2020/0017425 | A1 * | 1/2020 | Detjen | B01J 8/0055 |
| 2020/0055014 | A1 * | 2/2020 | Ye | C07C 1/24 |
| 2020/0163879 | A1 * | 5/2020 | Busignies-Goddin | A61P 15/02 |

* cited by examiner

SYSTEM AND METHOD FOR PERFORMING SEPARATION AND DEHYDROXYLATION OF FUMED SILICA SOOT PARTICLES

TECHNICAL FIELD

The present invention relates to the field of manufacturing of optical fibres and relates to a system and method for performing separation and dehydroxylation of fumed silica particles. The present application is a Divisional Application based on Ser. No. 16/849,956 filed on Apr. 15, 2020, and claims priority from Indian application 201921032781 filed on 13 Aug. 2019, the disclosure of which is hereby incorporated by reference herein.

BACKGROUND

Over the last few years, there has been an exponential rise in the manufacturing of optical fibres due to an overgrowing demand of the optical fibres. The manufacturing of optical fibres has two major stages. The first stage involves the manufacturing of optical fibre preforms and the second stage involves drawing the optical fibres from the optical fibre preforms. In general, the quality of optical fibres depends on conditions of manufacturing. So, a lot of attention is paid towards the manufacturing of the optical fibre preforms with good characteristic. These optical fibre preforms include an inner glass core surrounded by a glass cladding having a lower index of refraction than the inner glass core. The dehydration of silica is a requisite in optical fibre manufacturing to remove OH from optical fibre preform. Conventionally, the silica particles obtained after processes such as OVD is geometry and density specific. This poses a challenge for performing dehydration of the silica particles in the preform requires continuous processing by coming in contact with reagent and getting treated with heat. The improper processing of the f silica particles may affect quality of the optical fibre preform.

In light of the above stated discussion, there is a need for a system and method for obtaining dehydrated silica particles.

SUMMARY

The present disclosure provides a separator system for performing separation and dehydroxylation of fumed silica particles. The separator system includes a first inlet. The separator system includes a second inlet. In addition, the separator system includes a main body of a double entry cyclone. Further, the separator system includes a first outlet. Furthermore, the separator system includes a second outlet. The first inlet is utilized for collecting a primary feed of fumed silica particles from a gaseous stream into a double entry cyclone. The primary feed of fumed silica particles is collected in a fluidized (free flowing) state. The second inlet is utilized for collecting a secondary feed of chlorine gas into the double entry cyclone. The secondary feed of chlorine gas is collected for performing dehydroxylation of the fluidized (free flowing) fumed silica particles. The main body of the double entry cyclone is utilized in treating the primary feed of the silica particles and the secondary feed of chlorine gas along with heat inside the double entry cyclone. The first outlet is utilized for releasing the dehydrated silica particles. The second outlet is utilized for releasing the water molecules and other gases after performing dehydroxylation of the fumed silica particles.

A primary object of the present disclosure is to provide a system to perform separation of fumed silica particles from a gaseous stream.

Another object of the present disclosure is to provide the system to perform dehydroxylation of the fumed silica particles.

Yet another object of the present disclosure is to provide the system to perform separation and dehydroxylation of the fumed silica particles in a double entry cyclone separator.

Yet another object of the present disclosure is to reduce overall time while performing separation and dehydroxylation of the fumed silica particles.

Yet another object of the present disclosure is to increase production and minimize wastage after performing separation and dehydroxylation of the fumed silica particles.

Yet another object of the present disclosure is to perform dehydroxylation of the fluidized (free flowing) fumed silica particles in a chamber.

Yet another object of the present disclosure is to perform dehydroxylation of the fluidized (free flowing) fumed silica particles in one or more chambers.

Yet another object of the present disclosure is to perform dehydroxylation of low porosity with the defined geometry fumed silica particles.

In an aspect, the present disclosure provides a separator system for performing separation and dehydroxylation of fumed silica particles. The separator system includes a first inlet. The separator system includes a second inlet. In addition, the separator system includes a main body of a double entry cyclone. Further, the separator system includes a first outlet. Furthermore, the separator system includes a second outlet. The first inlet is utilized for collecting a primary feed of fumed silica particles from a gaseous stream into a double entry cyclone. The primary feed of fumed silica particles is collected in a fluidized (free flowing) state. The second inlet is utilized for collecting a secondary feed of chlorine gas into the double entry cyclone. The secondary feed of chlorine gas is collected for performing dehydroxylation of the fluidized (free flowing) fumed silica particles in the cyclone. The main body of the double entry cyclone is utilized in treating the primary feed of the silica particles and the secondary feed of chlorine gas along with heat inside the double entry cyclone. The heat is provided for chemical reaction by high temperature environment inside the cyclone. The first outlet is utilized for releasing the dehydrated silica particles. The second outlet is utilized for releasing the water molecules and other gases after performing dehydroxylation of the fumed silica particles.

In an embodiment of the present disclosure, the vortex formation imparts centrifugal force on the fluidized (free flowing) fumed silica particles. The separation and dehydroxylation of the fumed silica particles happens for releasing dehydrated fumed silica particles and water molecules.

In an embodiment of the present disclosure, the fumed silica particles undergoes dehydroxylation for removing physiosorbed water molecules and chemisorbed water molecules. The chemisorbed water molecules are removed after removal of the physiosorbed water molecules. The physiosorbed water molecules are removed at temperature of about 200° Celsius. The chemisorbed water molecules remaining after temperature of 200° Celsius is in range of about 30 parts per million to 50 parts per million.

In an embodiment of the present disclosure, the separator system (100) performs dehydroxylation of isolated SiOH groups, geminal SiOH groups and vicinal SiOH groups. The dehydroxylation of isolated SiOH groups, geminal SiOH groups and vicinal SiOH groups is defined by rate law $dc/dt=-k[c]^n$ at temperature in range of about 320° Celsius to 12000 Celsius.

In an embodiment of the present disclosure, the fumed silica particles undergoes separation and dehydroxylation in a time period. The time period for separation and dehydroxylation of the fumed silica particles depends upon one or more factors.

In an aspect, the present disclosure provides a method. The method performs separation of fumed silica particles. The method includes a first step to collect a primary feed of fumed silica particles from a gaseous stream into a double entry cyclone from a first inlet. The method includes another step to collect a secondary feed of chlorine gas into the double entry cyclone from a second inlet. The method includes another step to treat the primary feed of the fumed silica particles and the secondary feed of chlorine gas along with heat inside a main body of the double entry cyclone. The method includes another step to release the dehydrated fumed silica particles from a first outlet. The method includes another step to release the water molecules and other gases after performing separation of the fumed silica particles from a second outlet. The primary feed of fumed silica particles is collected in a fluidized (free flowing) state. The secondary feed of chlorine gas is collected to perform dehydroxylation of the fluidized (free flowing) fumed silica particles.

In an embodiment of the present disclosure, the method includes another step to perform dehydroxylation of the fluidized (free flowing) fumed silica particles in a chamber. The dehydroxylation is performed after performing separation of the fumed silica particles in the double entry cyclone. The chamber is surrounded by one or more induction furnaces.

In an embodiment of the present disclosure, the method includes another step to perform dehydroxylation of the fluidized (free flowing) fumed silica particles in one or more chambers. The dehydroxylation is performed after performing separation of the fumed silica particles in the double entry cyclone. The one or more chambers are surrounded by one or more induction furnaces.

In an embodiment of the present disclosure, the method includes 30 another step to perform compaction of the fluidized (free flowing) fumed silica particles using a punch and a die apparatus. The compaction is performed after performing separation of the fumed silica particles in the double entry cyclone. The compaction is performed for performing dehydroxylation of compacted fumed silica particles.

BRIEF DESCRIPTION OF FIGURES

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
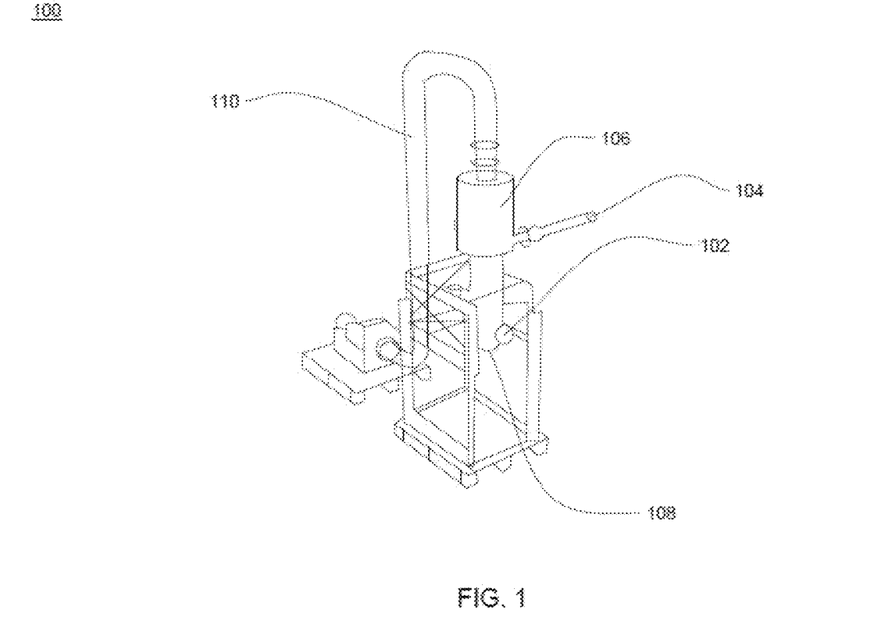
FIG. 1 illustrates a three dimensional view of a system to perform separation and dehydroxylation of fumed silica particles, in accordance with various embodiments of the present disclosure.
Figure 2:
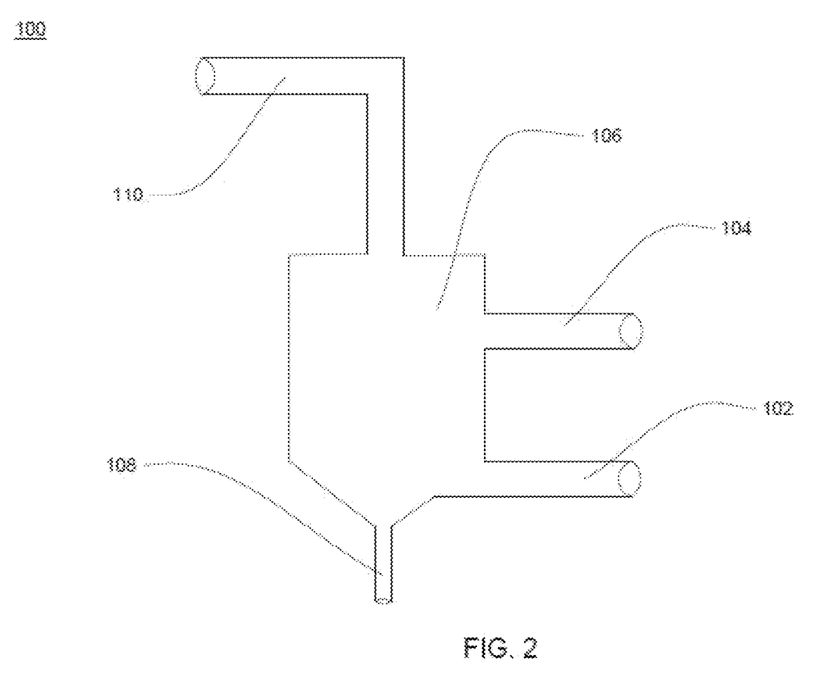
FIG. 2 illustrates a two dimensional view of the separator system to perform separation and dehydroxylation of fumed silica particles, in accordance with various embodiments of the present disclosure.

FIG. 1 illustrates a general overview of a separator system 100 to perform separation and dehydroxylation of fumed silica particles, in accordance with various embodiments of the present disclosure. FIG. 2 illustrates a two dimensional view of the separator system 100 to perform separation and dehydroxylation of fumed silica particles, in accordance with various embodiments of the present disclosure. The separator system 100 performs separation and separation of the fumed silica particles. The separator system 100 includes a first inlet 102, and a second inlet 104. In addition, the separator system 100 includes a main body 106 of a double entry cyclone, a first outlet 108 and a second outlet 110.

In general, silica particles are white flaky substance consisting largely of silica, used in manufacturing of optical fibre preforms. In general, dehydroxylation is loss or removal of water from something. In addition, dehydroxylation involves heating process through which hydroxyl group (OH) is released by forming water molecule.

The separator system 100 includes the first inlet 102. The first inlet 102 is utilized to collect a primary feed of fumed silica particles from a gaseous stream into the double entry cyclone. In an embodiment of the present disclosure, the primary feed comes from particle generation system. In addition, the primary feed contains the fumed silica particles and other gases. The first inlet 102 collects the primary feed of silica particles in a fluidized (free flowing) state. In an embodiment of the present disclosure, the first inlet 102 passes the primary feed of the fumed silica particles inside the main body 106 of the double entry cyclone.

The separator system 100 includes the second inlet 104. The second inlet 104 is utilized to collect a secondary feed of chlorine gas into the double entry cyclone. The second inlet 104 collects the secondary feed of chlorine gas to perform dehydroxylation of fluidized (free flowing) fumed silica particles. In an embodiment of the present disclosure, the second inlet 104 passes the secondary feed of the fumed silica particles inside the main body 106 of the double entry cyclone.

In an embodiment of the present disclosure, the first inlet 102 collects the secondary feed of chlorine gas into the double entry cyclone. In an embodiment of the present disclosure, the second inlet 104 collects the primary feed of the fumed silica particles from the gaseous stream into the double entry cyclone. In other words, the first inlet 102 and the second inlet 104 may operate interchangeably.

In an embodiment of the present disclosure, the primary inlet creates a suction pressure to collect the primary feed of fumed silica particles into the double entry cyclone. In an embodiment of the present disclosure, the secondary inlet creates a suction pressure to collect the secondary feed of chlorine gas into the double entry cyclone. In an embodiment of the present disclosure, the first inlet 102 includes a plurality of nozzles to shower the primary feed of fumed silica particles into the double entry cyclone. In an embodiment of the present disclosure, the second inlet 104 includes the plurality of nozzles to shower the secondary feed of chlorine gas into the double entry cyclone.

The separator system 100 includes the main body 106 of the double entry cyclone. The main body 106 of the double entry cyclone is utilized to treat the primary feed of the silica particles and the secondary feed of chlorine gas along with heat inside the double entry cyclone. In addition, the double entry cyclone imparts centrifugal force on the fluidized (free flowing) fumed silica particles to perform dehydroxylation and separation of the fumed silica particles. In an embodiment of the present disclosure, the double entry cyclone has higher temperature due to resistance heating. In general, resistance heating is defined as heat produced by passing an electric current through a material that preferably has high resistance. In another embodiment of the present disclosure, the double entry cyclone has higher temperature due to induction. In addition, the double entry cyclone is insulated to prevent leakage of heat from the double entry cyclone.

In an embodiment of the present disclosure, the vortex formation is result of design of the double entry cyclone. The primary inlet and the secondary inlet collects the primary feed and the secondary feed tangentially such that they result in the vortex formation inside the double entry cyclone. In an embodiment of the present disclosure, primary inlet feed tangentially such that they result in the vortex formation inside the double entry cyclone and secondary inlet feed perpendicular to the primary flow. In an embodiment of the present disclosure, secondary inlet feed tangentially such that they result in the vortex formation inside the double entry cyclone and primary inlet feed perpendicular to the primary flow. In an embodiment of the present disclosure, particulate formed after treatment of the primary feed of the fumed silica particles and the secondary feed of chlorine gas is collected in a hopper.

The separator system 100 includes the first outlet 108. The first outlet 108 is utilized to release SiO2 particles. The first outlet 108 is utilized to release dehydrated fumed silica particles. Further, the separator system 100 includes the second outlet 110. The second outlet 110 is utilized to release water molecules and other gases after performing separation and dehydroxylation of the fumed silica particles. The other gases include HCl, Nitrogen, air and the like.

The fumed silica particles undergoes dehydroxylation to remove physiosorbed water molecules and chemisorbed water molecules. In general, water associated with silica is in one of two forms. The two forms includes pysiosorbed water molecules and chemisorbed water molecules. Further, the chemisorbed water molecules includes but may not be limited to vicinal silanols, geminal silanols, and isolated silanols. The physiosorbed water molecules are removed at temperature of about 200° Celsius. The chemisorbed water molecules are removed at temperature greater than 200° Celsius. In an embodiment of the present disclosure, the chemisorbed water molecules remaining after temperature of 200° Celsius is in a range of about 30 parts per million to 50 parts per million. In another embodiment of the present disclosure, the range of the chemisorbed water molecules remaining after temperature of 200° Celsius may vary. In an embodiment of the present disclosure, the chemisorbed water molecules remaining after temperature of 200° Celsius is given by $\alpha OH$ in a range of 4.6 per nm2 to 4.9 per nm2.

The physiosorbed water molecules are removed by treating the fumed silica particles up to temperature of about 200° Celsius. The chemisorbed water molecules are removed by treating the fumed silica particles above temperature of 2000 Celsius. In addition, there is a possibility of rehydration of the water molecules up to temperature in a range of about 400° Celsius to 500° Celsius.

The dehydroxylation of the fumed silica particles takes place in presence of the chlorine gas. The dehydroxylation of isolated SiOH groups, geminal SiOH groups and vicinal SiOH groups is defined by rate law $dc/dt=-k[c]^n$ at temperature in range of about 320° Celsius to 1200° Celsius. In an embodiment of the present disclosure, value of n is around 0.91 and the value of Ea is around 44.2 kilojoule per mol at temperature in range of 320° Celsius to 431° Celsius. In another embodiment of the present disclosure, value of n is around 2.00 and the value of Ea is around 88.5 kilojoule per mol at temperature in range of 432° Celsius to 490° Celsius. In yet another embodiment of the present disclosure, value of n is around 2.00 and the value of Ea is around 101.9 kilojoule per mol at temperature in range of 491° Celsius to 637° Celsius. In yet another embodiment of the present disclosure, value of n is around 2.00 and the value of Ea is around 116.9 kilojoule per mol at temperature in range of 638° Celsius to 758° Celsius. In yet another embodiment of the present disclosure, value of n is around 2.00 and the value of Ea is around 207.6 kilojoule per mol at temperature in range of 759° Celsius to 1122° Celsius.

The fumed silica particles undergoes separation and dihydroxylation in a time period. The time period for separation and dehydroxylation of the fumed silica particles depends upon one or more factors. The one or more factors include porosity of the fumed silica particles, geometry of the fumed silica particles, quantity of the fumed silica particles, temperature inside the double entry cyclone, the size of the cyclone, and the like. In an embodiment of the present disclosure, the time period required for dehydroxylation of the fumed silica particles depends on diffusion of chlorine in the silica silica.

In an example, the dehydroxylation of the water molecules from concentration of 30 parts per million at a temperature of 200° Celsius to concentration of 0.1 parts per million for a given geometry and density takes place in time period of about 2 hours when treated at temperature of about 1100° Celsius. In another example, the time period required for dehydration of the fluidized (free flowing) silica particles of given mass is in a range of about 10 minutes to 15 minutes. In another example, the time period required for dehydration of the fluidized (free flowing) silica particles depends on particles flowing length inside the cyclone. In addition, the time taken for thermal diffusion depends on density and geometry of optical fiber preform.

In an embodiment of the present disclosure, the dehydrated fumed silica particles from the first outlet 108 of the double entry cyclone are stored in a storage tank. The dehydrated fumed silica particles are stored into the storage tank at a flow rate of about 500 grams per minute. In an embodiment of the present disclosure, the dehydrated fumed silica particles are stored into the storage tank at any suitable flow rate.

Figure 3:
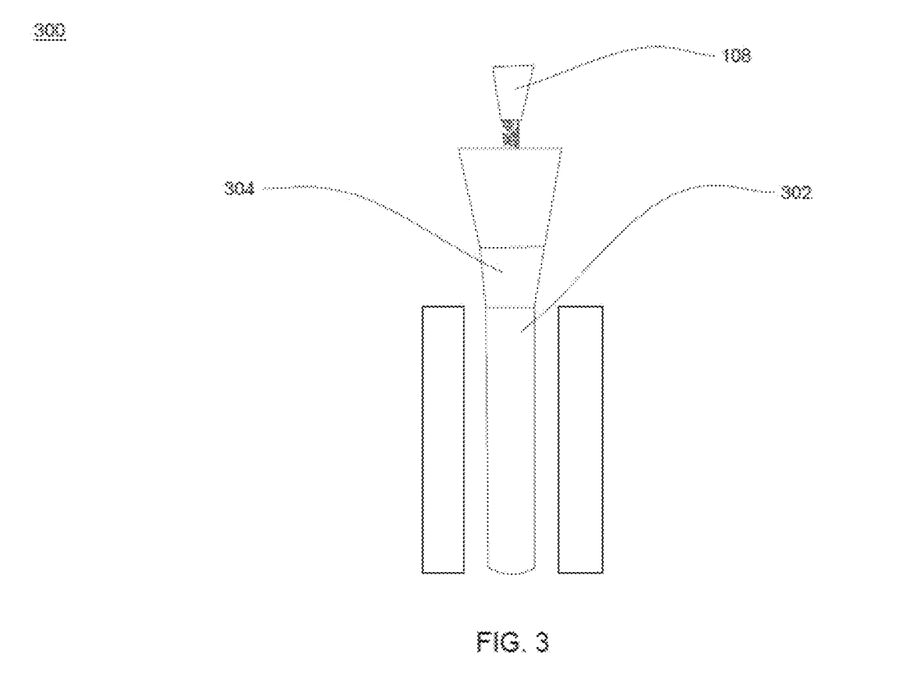
FIG. 3 illustrates a general overview of a chamber to perform dehydroxylation of fluidized (free flowing) fumed silica particles, in accordance with various embodiments of the present disclosure.

FIG. 3 illustrates a general overview 300 of a chamber 302 to perform dehydroxylation of fluidized (free flowing) fumed silica particles, in accordance with various embodiments of the present disclosure. The chamber 302 is placed below the storage tank 304 placed below the first outlet 108 of the double entry cyclone. In an embodiment of the present disclosure, the chamber 302 is utilized to perform dehyroxylation of the fluidized (free 5 flowing) fumed silica particles. The dehydroxylation is performed after performing separation of the fumed silica particles in the double entry cyclone. The chamber 302 is surrounded by one or more induction furnaces. The one or more induction furnaces provide heat to the chamber 302.

In an embodiment of the present disclosure, the chamber 302 has height of 7 meter. In another embodiment of the present disclosure, height of the chamber 302 may vary. In an embodiment of the present disclosure, the chamber 302 has radius of 10.2 centimeter. In another embodiment of the present disclosure, radius of the chamber 302 may vary. In an embodiment of the present disclosure, the chamber 302 is made of quartz. In another embodiment of the present disclosure, the chamber 302 is made of any other suitable material of the like. In an example, the chamber 302 is capable to treat the fumed silica particles up to weight of 25 kilogram continuously for one hour. In an another example the chamber 302 may be suitably modified to treat the fumed silica particles up to any defined weight for a predetermined time.

In some aspects of present disclosure, the secondary feed into the double entry cyclone separator 100 may be pre-heated chlorine gas. The pre-heated chlorine gas inside the double entry cyclone separator 100 may increase the efficiency of separation and dehydroxylation process of the primary feed of fumed silica particles. The pre-heated chlorine gas inside the double entry cyclone separator 100 reduces the total time consumed for the complete removal of physisorbed and chemisorbed water molecules from the fumed silica particles. In some aspects of the present disclosure, the temperature of the double entry cyclone separator 100 may be maintained at 1200 degree Celsius to perform separation and dehydroxylation of the fumed silica particles. In different aspects of the present disclosure, the time duration for dehydroxylation of the primary feed of fumed silica particles in presence of secondary feed of chlorine gas inside the double entry cyclone separator 100 when the temperature of double entry cyclone separator 100 is maintained at about 1200 degree Celsius varies as per table 1:

TABLE 1

| Primary feed | Secondary feed | Time duration for dehydroxylation (in minutes) |
| --- | --- | --- |
| Fumed silica particles at normal temperature | Chlorine gas at normal temperature | X |
| Fumed silica particles at normal temperature | Pre-heated chlorine gas at 1200 degree Celsius | 0.9 X |
| Pre-heated fumed silica particles between 500 to 600 degree Celsius | Pre-heated chlorine gas between 1000 to 1200 degree Celsius | 0.7 X |
| Pre-heated fumed silica particles between 1000 to 1200 degree Celsius | Pre-heated chlorine gas between 1000 to 1200 degree Celsius | 0.5 X |

In some aspect of the present disclosure, In pre-heated primary feed and secondary feed are received inside the double entry cyclone separator 100, the temperature of mixture will reach 1200 degree in less time and less vertical height that would lead to reduction in vertical length of the double entry cyclone separator 100. Since the temperature of mixture will reach 1200 degree in less time and less vertical height that would lead to reduction in diameter of the double entry cyclone separator 100 while maintaining same height of the separator 100. In one aspect of the present disclosure, the diameter and height of the double entry cyclone separator 100 may be optimized based on the pre-heating conditions of the primary feed and the secondary feed into the double entry cyclone separator 100.

In some aspects of the present disclosure, the main body 106 of the double entry cyclone separator 100 may be of a cylindrical shape. A height to diameter ratio of the main body 106 may be designed with respect to the temperature of the primary feed and the secondary feed. If a height of the main body 106 is H meter and diameter of the double entry cyclone separator 100 separator is D meter, the height to diameter ratio (i.e., H/D) is in a range of 5 to 20. In one exemplary aspect of the present disclosure, the height H is about 2 meter and diameter D is about 0.4 m. The primary feed of fumed silica particles moves from the upward direction towards the downward direction in the main body 106 while the dehydroxylation and separation of fumed silica particles is performed to release SiO2 from the first outlet 108 in the bottom of the main body 106. In some aspects of the present disclosure, the volume of primary feed is about 200 standard litre per minute (slpm), the volume of secondary feed is 2 slpm and the ratio of primary feed to secondary feed is 10 to 150.

In one aspect of the present disclosure, if the temperature of the main body 106 is kept between 1100 degree Celsius to 1200 degree Celsius, the primary feed of fumed silica particles is collected from the first inlet 102 at room temperature, the secondary feed of chlorine gas is collected from second inlet 104 at room temperature, the dehydroxylation and separation of the fumed silica particles may be completed in 80% to 100% of the height H of the main body 106 while the fumed silica particles is moving in vertically downward direction. In another aspect of the present disclosure, if the temperature of the main body 106 is kept between 1100 degree Celsius to 1200 degree Celsius, the primary feed of fumed silica particles is collected from the first inlet 102 at room temperature, the secondary feed of pre-heated chlorine gas is collected from second inlet 104 at temperature between 600 degree Celsius to 1000 degree Celsius, the dehydroxylation and separation of the fumed silica particles may be completed in 60% to 85% of the height H of the main body 106 while the fumed silica particles is moving in vertically downward direction. In another aspect of the present disclosure, if the temperature of the main body 106 is kept between 1100 degree Celsius to 1200 degree Celsius, the primary feed of pre-heated fumed silica particles is collected from the first inlet 102 at temperature between 600 degree Celsius to 1000 degree Celsius, the secondary feed of chlorine gas is collected from second inlet 104 at room temperature, the dehydroxylation and separation of the fumed silica particles may be completed in 40% to 70% of the height H of the main body 106 while the fumed silica particles is moving in vertically downward direction. In another aspect of the present disclosure, if the temperature of the main body 106 is kept between 1100 degree Celsius to 1200 degree Celsius, the primary feed of pre-heated fumed silica particles is collected from the first inlet 102 at temperature between 600 degree Celsius to 1000 degree Celsius, the secondary feed of pre-heated chlorine gas is collected from second inlet 104 at temperature between 600 degree Celsius to 1000 degree Celsius, the dehydroxylation and separation of the fumed silica particles may be completed in 30% to 60% of the height H of the main body 106 while the fumed silica particles is moving in vertically downward direction. Based on the preset conditions of the primary feed and secondary feed, the size of the double entry cyclone separator 100 may be efficiently designed.

In some aspects of the present disclosure, the diameter D of the main body 106 may be optimized for a fixed height H of the main body 106 based on the preset conditions of the primary feed of fumed silica particles and the secondary feed of the chlorine gas. In one aspect of the present disclosure, when the temperature of the main body 106 is kept between 1100 degree Celsius to 1200 degree Celsius, the primary feed of fumed silica particles is collected from the first inlet 102 at room temperature, the secondary feed of chlorine gas is collected from second inlet 104 at room temperature, the dehydroxylation and separation of the fumed silica particles may be completed in a reduced diameter main body 106 having diameter in a range of 0.9*D to D while the fumed silica particles is moving in vertically downward direction. In another aspect of the present disclosure, if the temperature of the main body 106 is kept between 1100 degree Celsius to 1200 degree Celsius, the primary feed of fumed silica particles is collected from the first inlet 102 at room temperature, the secondary feed of pre-heated chlorine gas is collected from second inlet 104 at temperature between 600 degree Celsius to 1000 degree Celsius, the dehydroxylation and separation of the fumed silica particles may be completed in a reduced diameter main body 106 having diameter in a range of 0.85*D to 0.95*D while the fumed silica particles is moving in vertically downward direction. In another aspect of the present disclosure, if the temperature of the main body 106 is kept between 1100 degree Celsius to 1200 degree Celsius, the primary feed of pre-heated fumed silica particles is collected from the first inlet 102 at temperature between 600 degree Celsius to 1000 degree Celsius, the secondary feed of chlorine gas is collected from second inlet 104 at room temperature, the dehydroxylation and separation of the fumed silica particles may be completed in a reduced diameter main body 106 having diameter in a range of 0.7*D to 0.8*D while the fumed silica particles is moving in vertically downward direction. In another aspect of the present disclosure, if the temperature of the main body 106 is kept between 1100 degree Celsius to 1200 degree Celsius, the primary feed of pre-heated fumed silica particles is collected from the first inlet 102 at temperature between 600 degree Celsius to 1000 degree Celsius, the secondary feed of pre-heated chlorine gas is collected from second inlet 104 at temperature between 600 degree Celsius to 1000 degree Celsius, the dehydroxylation and separation of the fumed silica particles may be completed in a reduced diameter main body 106 having diameter in a range of 0.6*D to 0.75*D while the fumed silica particles is moving in vertically downward direction.

Figure 4:
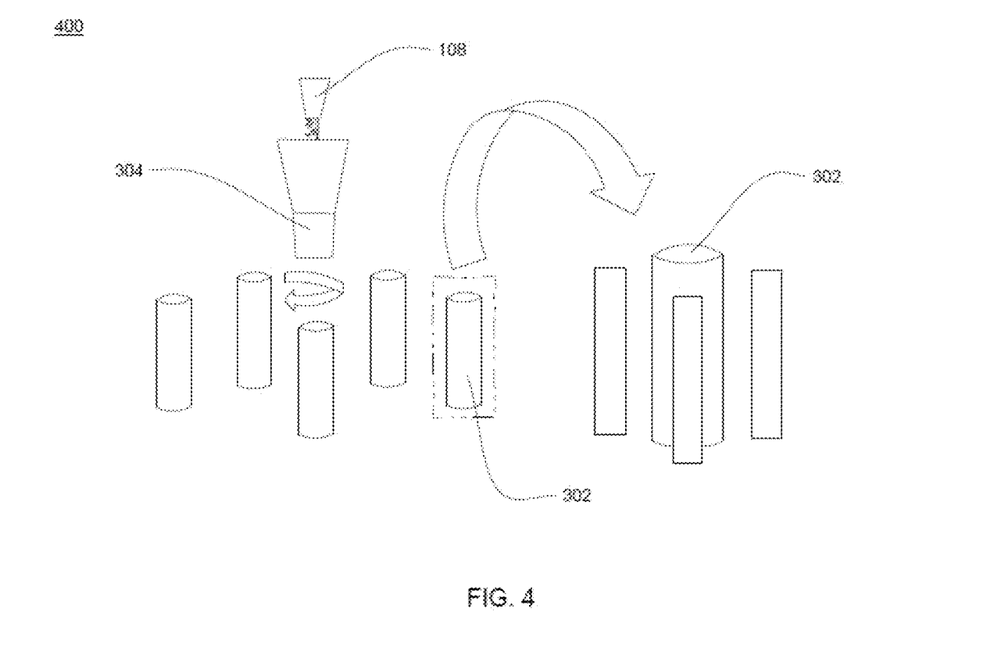
FIG. 4 illustrates a general overview of one or more chambers to perform dehydroxylation of fluidized (free flowing) fumed silica particles, in accordance with various embodiments of the present disclosure.

FIG. 4 illustrates a general overview 400 of one or more chambers 302 to perform dehydroxylation of free flowing fumed silica particles, in accordance with various embodiments of the present disclosure. The one or more chambers 302 are placed below the storage tank 304 placed below the first outlet 108 of the double entry cyclone. In another embodiment of the present disclosure, the dehydroxylation is performed after performing separation of the fumed silica particles in the double entry cyclone. The one or more chambers 302 are surrounded by one or more induction furnaces. In addition, each chamber of the one or more chambers 302 is surrounded by the one or more induction furnaces. The one or more induction furnaces provide heat to the one or more chambers 302.

In an embodiment of the present disclosure, each chamber of the one or more chambers 302 has height of 2 meter. In another embodiment of the present disclosure, height of each chamber of the one or more chambers 302 may vary. In an embodiment of the present disclosure, each chamber of the one or more chambers 302 has radius of 8.5 centimeter. In another embodiment of the present disclosure, radius of each chamber of the one or more chambers 302 may vary. In an embodiment of the present disclosure, each chamber of the one or more chambers 302 is made of quartz. In another embodiment of the present disclosure, each chamber of the one or more chambers 302 is made of any other suitable material of the like. In an example, the one or more chambers 302 are capable to treat the fumed silica particles up to weight of 5 kilogram continuously for one hour. In an another example the one or more chambers 302 may be suitably modified to treat the fumed silica particles up to any defined weight for a predetermined time.

Figure 5:
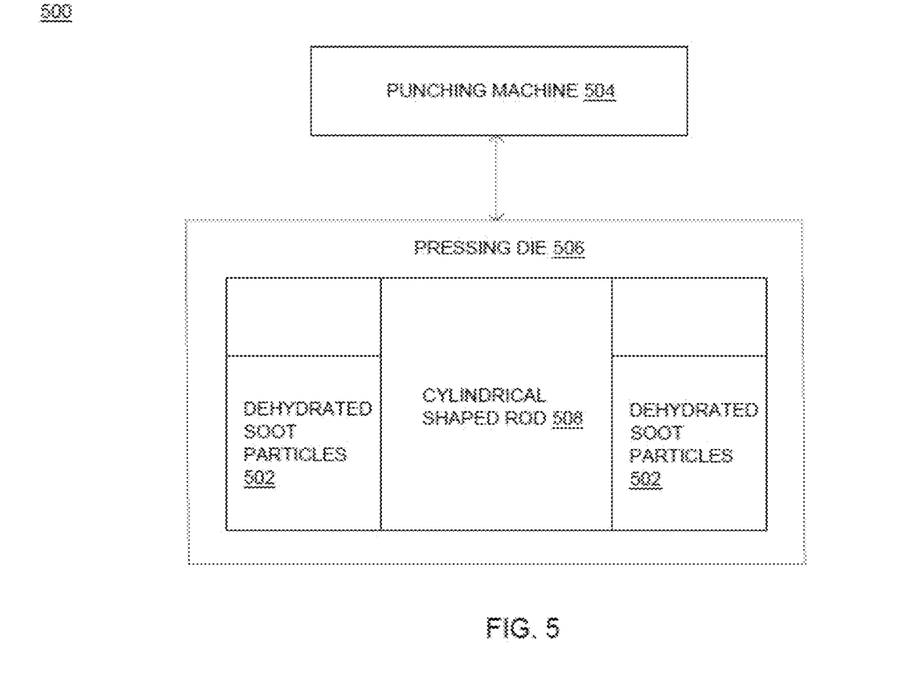
FIG. 5 illustrates a general overview of a mold assembly to perform compaction of fluidized (free flowing) fumed silica particles, in accordance with various embodiments of the present disclosure.

FIG. 5 illustrates a general overview of a mold assembly 500 to perform compaction of fluidized fumed silica particles 502, in accordance with various embodiments of the present disclosure. The fluidized fumed silica particles 502 are separated silica particles released from the first outlet 108 of FIG. 1. The mold assembly 500 includes a punching machine 504, a pressing die 506 and a cylindrical shaped rod 508. The punching machine and the pressing die represent a punch and a die apparatus. The punch and the die apparatus is used to perform compaction of the fluidized fumed silica particles 502. The fluidized fumed silica particles 502 are low porosity with the defined geometry fumed silica particles. The dehydroxylation of the low porosity with the defined geometry fumed silica particles is achieved after compaction. The compaction is performed after performing separation of the fumed silica particles in the double entry cyclone (as shown in FIG. 1 and FIG. 2). In addition, the compaction is performed for performing dehydroxylation of compacted fumed silica particles.

The fluidized fumed silica particles 502 are compacted using the mold assembly 500 to manufacture compact silica particles. object. In addition, the compacted object is sintered to manufacture a clad preform. The mold assembly 500 performs pressing of the fluidized fumed silica particles 502. The pressing of the fluidized fumed silica particles 502 is a compaction of the fluidized fumed silica particles 502 to manufacture the compact object as preform.

The mold assembly 500 includes the pressing die 506. In general, die is a specialized tool used in manufacturing industries to cut or shape material, mostly using a press. In addition, dies are customized according to shape and size of target products. In an embodiment of the present disclosure, cross-section of the pressing die 506 is cylindrical. The pressing die 506 is used for manufacturing of the compact object of cylindrical shape. In an embodiment of the present disclosure, the pressing die 506 has a cylindrical shape cavity at a central position. In an embodiment of the present disclosure, the cylindrical shape cavity is on upper surface of the pressing die 506 for positioning of the cylindrical shaped rod 508.

In an embodiment of the present disclosure, the cylindrical shaped rod 508 is a mold rod used for manufacturing of hollow compact object. In an embodiment of the present disclosure, the length of the cylindrical shaped rod 508 is defined according to required length of the clad preform.

In an embodiment of the present disclosure, the pressing die 506 has cavity around the cylindrical shaped rod 508. The shape and size of the cavity around the cylindrical shaped rod 508 is defined according to the shape and size of the required clad preform. In an embodiment of the present disclosure, the pressing die 506 has a first wall and a second wall. The first wall is an inner wall of the pressing die 506. The fluidized fumed silica particles 502 are loaded in between the cylindrical shaped rod 508 and inner wall of the pressing die 506.

The fluidized fumed silica particles 502 are loaded inside the cavity of the pressing die 506 from the storage tank 304. In an embodiment of the present disclosure, the cavity of the pressing die 506 is cylindrical in shape. The fluidized fumed silica particles 502 are loaded inside the cavity of the pressing die 506 based on the required size of the clad preform.

The fluidized fumed silica particles 502 present inside the cavity of the pressing die 506 are pressed using the punching machine 504. The punching machine 504 is a machine tool for punching or pressing of the fluidized fumed silica particles 502 to convert the fluidized fumed silica particles 502 into the compact object. In an embodiment of the present disclosure, the punching machine 504 is one of automatic machine or manual machine. In another embodiment of the present disclosure, the punching machine 504 works on hydraulic press. The fluidized fumed silica particles 502 are axially compressed or pressed to form the compact object around the cylindrical shaped rod 508. The punching machine 504 is used to apply pressure on the fluidized fumed silica particles 502 to form the compact object. The pressure is applied towards the pressing die 506 to press the fluidized fumed silica particles 502. In addition, the pressure is applied to press the fluidized fumed silica particles 502 to form the compact object of target density.

In an embodiment of the present disclosure, the fluidized fumed silica particles 502 are pressed using cold press technique. In general, cold press technique refers to the pressing of the dehydrated silica particles in mold assembly below sintering temperature or at room temperature. The cold pressing of the fluidized fumed silica particles 502 is performed to provide proper shape and density to the required clad preform.

In another embodiment of the present disclosure, the fluidized fumed silica particles 502 are pressed using hot press technique. In general, hot press technique refers to pressing of dehydrated silica particles using heated pressing die. In an embodiment of the present disclosure, the mold assembly 500 is enclosed inside one or more furnaces to increase temperature for pressing of the fluidized fumed silica particles 502. The one or more furnaces enables heating of the pressing die 506 for manufacturing of the compact object. In an embodiment of the present disclosure, the pressing die 506 is heated using radiation or convection to reach the desired temperature for the compaction of the fluidized fumed silica particles 502. In another embodiment of the present disclosure, the pressing die 506 is heated using induction or resistance techniques. In yet another embodiment of the present disclosure, the pressing die 506 is heated using any other suitable technique of the like. In an embodiment of the present disclosure, uniaxial pressing is done for the compaction of the fluidized fumed silica particles 502 in the heated pressing die 506. In another embodiment of the present disclosure, isostatic pressing is done for the compaction of the fluidized fumed silica particles 502 in the heated pressing die 506. The uniaxial pressing or isostatic pressing is done for the manufacturing of the compact object.

In an embodiment of the present disclosure, the compaction of the fluidized fumed silica particles 502 result in the decrease in volume and increase in density of the compact object. In an embodiment of the present disclosure, an inward pressure is applied on the fluidized fumed silica particles 502 to form the compact object. In an embodiment of the present disclosure, the punching machine 504 uniformly presses the fluidized fumed silica particles 502 from one or more sides of the pressing die 506.

The mold assembly 500 enables conversion of the fluidized fumed silica particles 502 into the cylindrical shape compact object. In addition, the pressing die 506 along with the punching machine 504 enable the conversion of the fluidized fumed silica particles 502 into the compact object with defined or target density.

In an embodiment of the present disclosure, the cylindrical shaped rod 508 is inserted into the mold assembly 500 for the formation of the hollow cylindrical shaped compact object. The hollow cylindrical shaped compact object is sintered for the formation of the hollow cylindrical shaped clad preform. In an embodiment of the present disclosure, the hollow cylindrical shaped compact object is sintered in a sintering furnace for the formation of the hollow cylindrical shaped clad preform. In general, sintering refers to a process of forming a glass preform or clad preform from the compacted object with facilitation of heat without melting compacted object to point of liquefaction. In an example, the hollow cylindrical shaped clad preform has a porosity of about 0.5. In another example, porosity of the hollow cylindrical shaped clad preform may vary. In general, porosity refers to bulk density of hollow cylindrical shape.

In an embodiment of the present disclosure, the double entry cyclone separator performs both separation and dehydroxylation of the fumed silica particles. In another embodiment of the present disclosure, the double entry cyclone separator performs dehydroxylation of the fumed silica particles. In an embodiment of the present disclosure, the dehydroxylation of the fumed silica particles is performed at a high temperature. In yet another embodiment of the present disclosure, the double entry cyclone separator performs only separation of the fumed silica particles. In that case, the dehydroxylation of the fumed silica particles is performed in the chamber (as shown in FIG. 3), in the one or more chambers (as shown in FIG. 4), or after compaction of the fluidized fumed silica particles (as shown in FIG. 5).

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A method for performing separation and dehydroxylation of fumed silica particles to manufacture a silica soot preform, the method comprising:

collecting a primary feed of fumed silica particles from a gaseous stream, where the primary feed of fumed silica particles is collected in a fluidized state;

collecting a secondary feed of chlorine gas, where the secondary feed of chlorine gas is collected for performing separation and dehydroxylation of the fluidized fumed silica particles;

treating the primary feed of the fumed silica particles and the secondary feed of chlorine gas in presence of heat;

releasing the dehydrated fumed silica particles, whereby separating and dehydroxylating the fumed silica particles; and performing compaction of the dehydrated fumed silica particles to form the silica soot preform, where the compaction is performed after performing separation and dehydroxylation of the fumed silica particles; where collecting the primary feed of fumed silica particles from a gaseous stream into a double entry cyclone from a first inlet; where collecting the secondary feed of chlorine gas into a double entry cyclone from a second inlet.

2. The method as claimed in claim 1 comprising, after performing separation of the fumed silica particles, releasing water molecules and gases from a second outlet.

3. The method as claimed in claim 1, where the fumed silica particles are treated at a temperature of less than or equal to 200 degree Celsius to remove physisorbed water molecules.

4. The method as claimed in claim 1, where the fumed silica particles are treated at a temperature of less than or equal to 1200 degree Celsius to remove chemisorbed water molecules.

* * * * *